Feb. 7, 1967   O. M. HAWKINS   3,302,455
TEST STAND FOR TESTING A SOLID PROPELLANT THAT
HAS BEEN CAST INTO A MOTOR CASE
Filed June 24, 1964   3 Sheets-Sheet 2
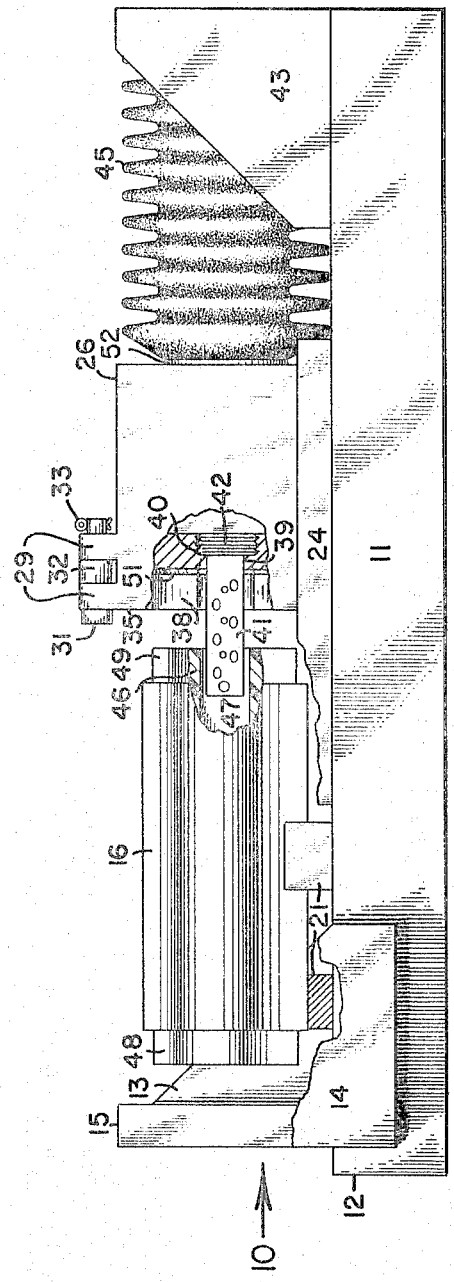
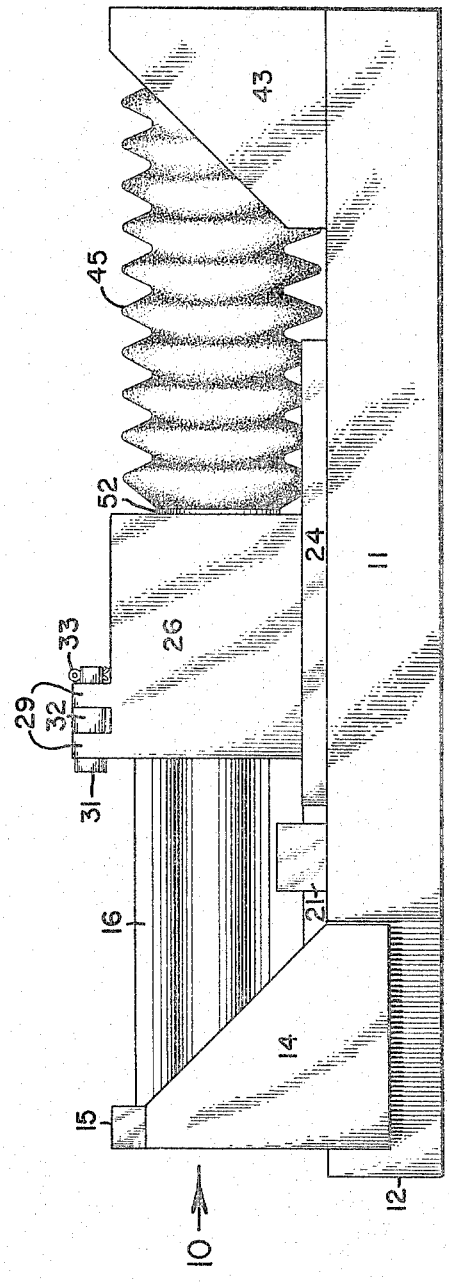
Oscar M. Hawkins INVENTOR.
BY *Rob D Williams*
ATTORNEY Oscar M. Hawkins INVENTOR.

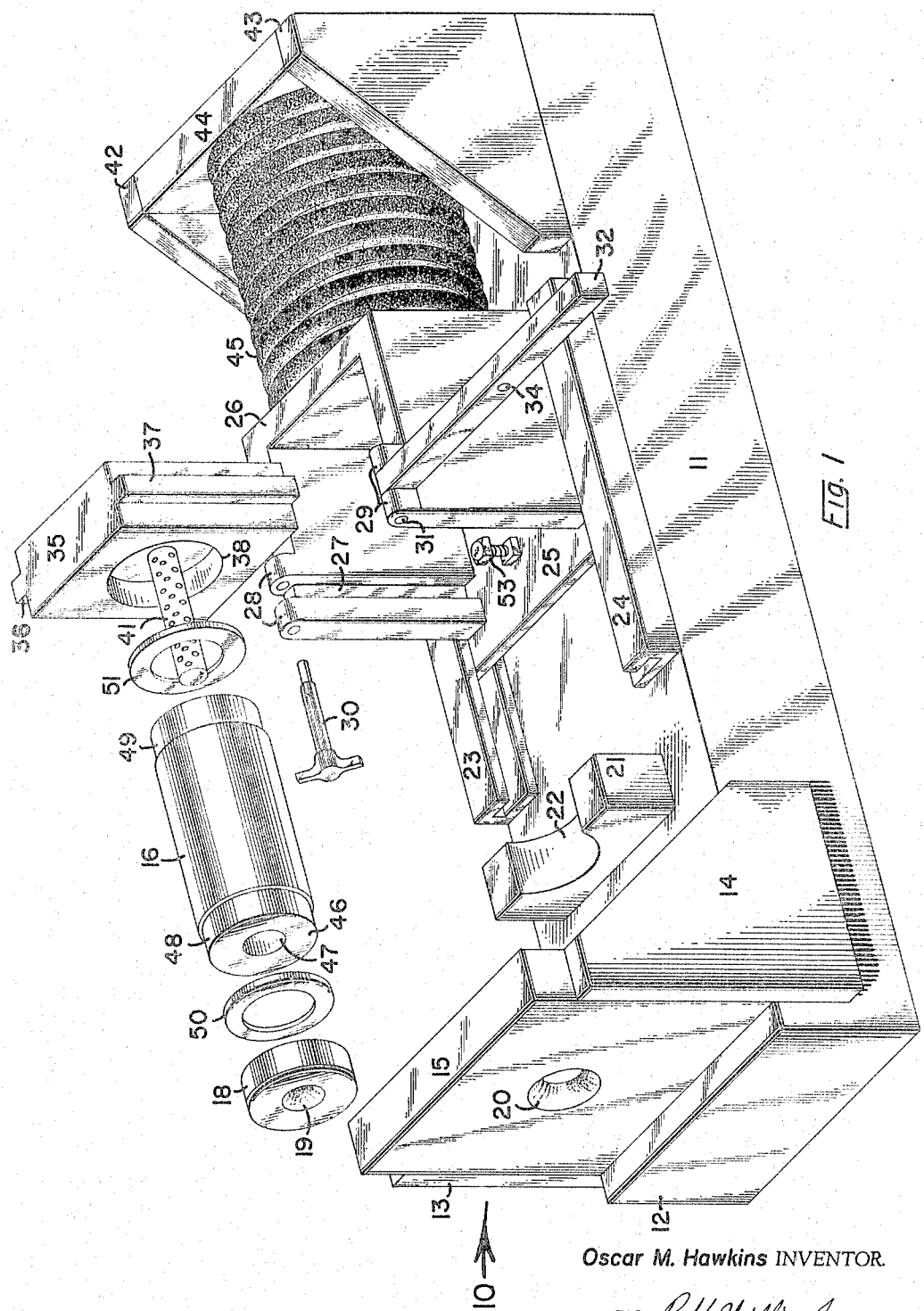
Oscar M. Hawkins INVENTOR.
BY
ATTORNEY

ATTORNEY

United States Patent Office 3,302,455
Patented Feb. 7, 1967

3,302,455
TEST STAND FOR TESTING A SOLID PROPELLANT THAT HAS BEEN CAST INTO A MOTOR CASE
Oscar M. Hawkins, Huntsville, Ala., assignor to Thiokol Chemical Corporation, Bristol, Pa., a corporation of Delaware
Filed June 24, 1964, Ser. No. 377,766
4 Claims. (Cl. 73—116)

This invention relates to improvements in test stands which sustain small motor cases containing solid propellants that are fired to determine the characteristics of the various solid propellant mixes that are cast in the small motor cases.

Previous to the use of the test stand embodying the invention, each of the small motor cases had to be very carefully prefabricated to meet strict specifications. Threads had to be provided at both ends of the motor case so that a head end and aft nozzle end could be secured to the motor case. Such fabrication presented hazardous conditions due to possible preignition of the solid propellant while the head end and aft end were threaded onto the motor case, since the solid propellant is cast, into the motor case prior to the attachment of the head and aft ends to the motor case. Thus, the motor case had to be assembled by remote wrenching to protect the personnel assembling the motor case. The same conditions would also exist it for some unforesen reason the motor case had to be disassembled before it had been fired.

During the handling of the motor case, the threads on the opposite ends thereof would, at times, be damaged thus preventing the head and aft ends from having good connections with the motor case or, in some instances, preventing the head and aft ends from being able to be connected to the motor case.

Such a procedure was not only very costly and very hazardous but, at times, would even prevent the firing of the solid propellant in the motor case.

It is an object of this invention, therefore, to provide a motor test stand that will eliminate, to a great extent, hazardous handling of a motor case and also reduce the cost of properly assembling a motor case for test firing.

By eliminating the threads on the motor case and providing a test stand that would retain the head and aft ends in rigid relation to the motor case, time and expense could be drastically reduced in the proper assembly of the motor case.

It is another object of the invention, therefore, to provide a test stand that will pressure seal the head and aft ends to the motor case.

The test stand would combine the assembling of the motor case and the firing thereof into one function, thus eliminating the function of pre-assembling the motor case prior to the firing function thereof.

In providing the test stand with a head end and an aft end, it was only necessary to place the motor case in the test stand and provide mechanically-operated means for pressure sealing the head and aft ends onto the motor case to provide a reasonably safe and inexpensive method of assembling the motor case for test firing.

The motor case is positioned in the test stand and the test stand is remotely controlled by the operator so that the ignition or any pre-ignition of the solid propellant that occurs would not cause serious and harmful injuries to the operator.

With the above and other objects and advantages in view, the invention employs the novel details of construction, arrangement and combination of parts more fully hereinafter described, claimed and illustrated in the accompanying drawings in which:

FIGURE 1 is a partly-exploded, perspective view of a test stand embodying the invention.

FIGURE 2 is an elevational side view showing the positioning of the motor case in the test stand and partly in section to show the ignition means for the solid propellant in the motor case.

FIGURE 3 is a view similar to FIGURE 2 showing the test stand in position to test fire the motor case.

Figure 4:
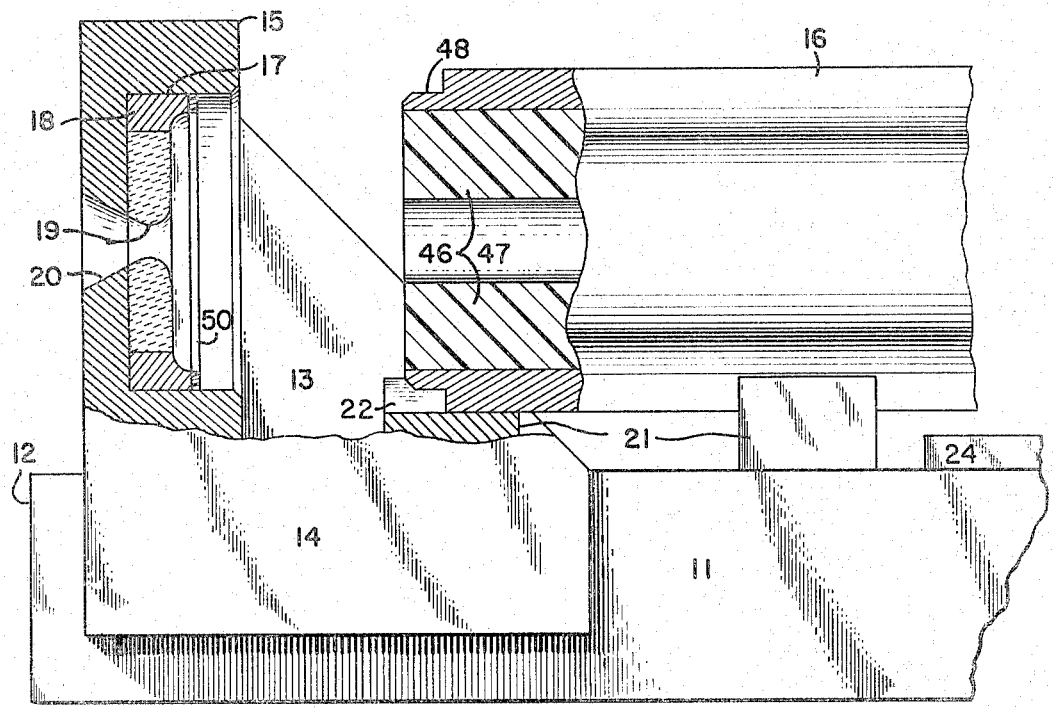
FIGURE 4 is an enlarged fragmentary sectional view of the aft or left end of the test stand, as in FIGURE 2.
Figure 5:
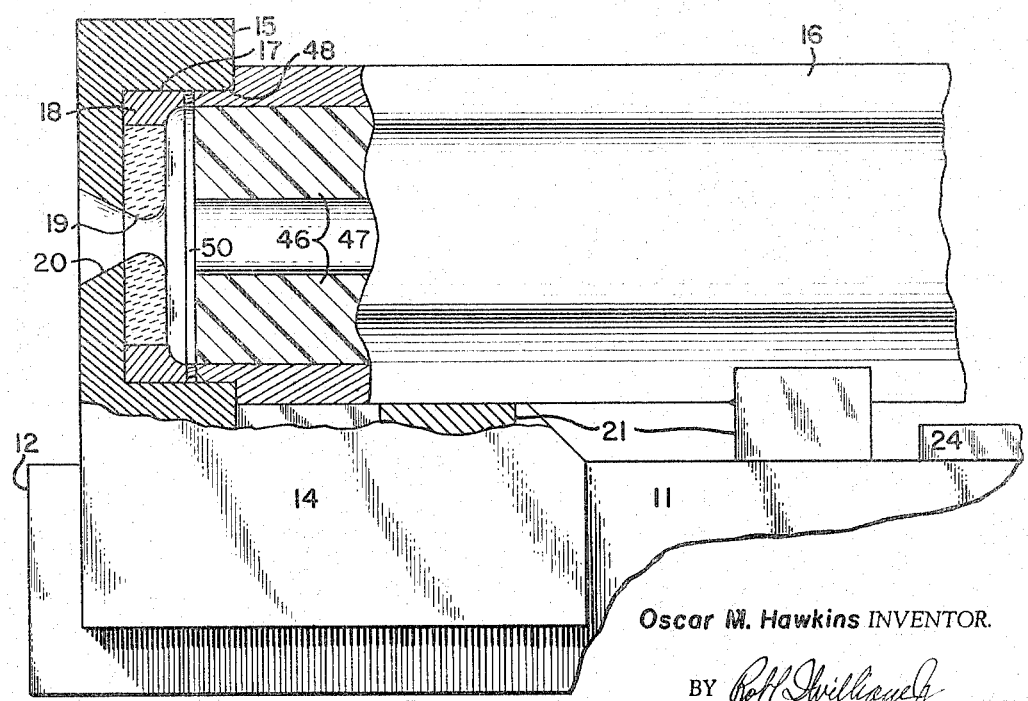
FIGURE 5 is an enlarged fragmentary sectional view of the aft or left end of the test stand, as in FIGURE 3.

Referring more in detail to the drawings wherein like parts are designated by like reference numerals, the reference numeral 10 is used to generally designate a test stand embodying the invention.

The test stand 10 comprises a base or bed 11 which is of substantially rectangular formation and may be hollow or solid as the prevailing conditions require.

Secured in any well-known manner to an end 12 of the base 11 are a pair of substantially triangular-shaped side brace or reinforcing plates 13 and 14 respectively. Positioned intermediately of the side plates 13 and 14 is an aft end 15 of a motor case 16. The aft end 15 is in solid contact at the bottom thereof with the base 11 and in solid contact at the opposite sides thereof with the side plates 13 and 14 and is rigidly secured thereto.

The aft end 15 is provided with a medially-located, circular seat or cavity 17 in which is positioned a nozzle insert 18. The insert 18 has a graphite throat insert 19 positioned in the center thereof, and the throat insert 19 is aligned with a diverging tapered exhaust port 20 in the aft end 15. The combined shape of the exhaust port 20 and throat insert 19 conform in configuration to a "De Laval" nozzle for a solid propellant rocket motor.

There are rigidly secured to the upper surface of the base 11 two or more motor supports 21. The supports 21 are equally spaced from each other inwardly of the aft end 15 and each of the supports 21 has a substantially semi-spherical seat 22 therein that conforms to the shape of the motor case 16 and cradles the motor case 16 therein during the test operation.

Spaced inwardly of the innermost support 21 and rigidly secured to the upper surface of the base 11 are a pair of U-shaped slide rails 23 and 24 respectively. The slide rails 23 and 24 are secured to the bed 11 so that the outer surfaces of the side rails 23 and 24 and the base 11 are in contiguous relation to each other.

Mounted for sliding movement within the side rails 23 and 24 is a substantially square-shaped table 25 and rigidly secured to the upper surface of the table 25 within the side rails 23 and 24 is a U-shaped frame 26.

Positioned in the inner surface of the side walls of the U-shaped frame 26 adjacent to and in parallel relation to the outer edges thereof are a pair of diametrically-opposed guide slots 27.

Integral with the upper edges of the U-shaped frame and positioned on opposing edges of the opposing slots 27 are a pair of apertured bosses 28 and 29 respectively. The bosses 28 are adapted to receive a shot pin 30 and the bosses 29 are adapted to receive a pivot pin 31 on which is hingedly mounted a latch bar 32. The outer end of the pivot pin 31 is adapted to receive a cotter key 33 and the latch bar 32 is provided with an aperture 34 so that when the latch bar is pivoted on the pivot pin 31 so that it can be positioned between the bosses 28, the aperture 34 therein will be aligned with the apertures in the bosses 28 so that the shot pin 30 may be inserted therein to retain the latch bar 32 in operational position.

The motor case 16 has a head end 35 which is provided with integral slide projections 36 and 37 on the opposite edges thereof, and the projections 36 and 37 are slidably received within the guide slots 27 in the side walls of the U-shaped frame 26.

The head end 35 is provided with a centrally-located seat or cavity 38 and an opening 39 which is aligned with the center of the seat 38. A threaded seat 40 is also provided in the head end 35 in alignment with the opening 39, and an igniter 41 extends through the seat 40, opening 39 and seat 38 to have the threaded end 42 thereof threadably engaged with the threaded seat 40, as shown in FIGURE 2.

Secured to the end of the base 11 at the end opposite to the end to which the plates 13 and 14 are secured are a similar pair of brace or reinforcing plates 42 and 43 respectively.

Positioned intermediately of the plates 42 and 43 and rigidly secured thereto and to the base 11 is a ram-supporting plate 44, and extending through the plate 44 and bellows 45 to be rigidly secured to the U-shaped frame 26 at the rear end thereof is a mechanically-operated ram 52. The ram 52 is of conventional structure, and it is deemed unnecessary, therefore, to illustrate this portion of the test stand 10.

In the operation of the test stand 10, the motor case 16 that has a solid propellant mix 46 to be tested precast therein is placed in position on the supports 21. The mix 46 has a central cavity 47 therein which receives therein the igniter 41, as shown in FIGURE 2.

The motor case 16 has a reduced end portion 48 which is adapted to be received in the seat 17 in the aft end 15 and a reduced end portion 49 which is adapted to be received in the seat 38 in the head end 35. A gasket 50 is positioned within the seat 17 and seals the end 48 of the motor case 16 within the seat 17. A gasket 51 is positioned within the seat 38 and seals the end 49 of the motor case 16 within the seat 38.

With the motor case 16 in the position shown in FIGURE 2 and the gaskets 50 and 51 in position, the mechanically-operated ram 52 is actuated to force the head end 35 against the motor case 16 and the end 48 of the motor case 16 into the seat 17. If the opposite ends of the motor case 16 are not properly aligned with the seats in the aft end 15 and the head end 35, an adjusting screw 53 on which the head end 35 rests may be manipulated to properly align the motor case 16. Sufficient force is exerted by the ram 52 to pressure seal the opposite ends of the motor case 16, and then the actuation of the ram 52 is stopped. The ram 52 will, however, remain in the position in which it has been stopped until the solid propellant mix 46 in the motor case 16 has been fired. The solid propellant mix 46 is fired by supplying the igniter 41 with a source of electrical current which operates the igniter 41 to fire the solid propellant mix 46.

After the solid propellant mix 46 in the motor case 16 has been fired, the action of the ram 52 is reversed, the motor case 16 is removed and a similar motor case with a solid propellant mix therein is positioned on the test stand 10 and the operation is repeated.

Repeated use of the test stand 10 can be maintained as rapidly as a new motor case is placed therein and fired, and the only preliminary function that has to be performed prior to the use of the test stand 10 is the casting of the solid propellant mix in the motor case, it being understood that a new igniter 41 must be inserted into the head end 35 each time a new motor case is positioned on the test stand 10 to be fired.

There has thus been provided a test stand that will safely and inexpensively permit the firing of a solid propellant mix; and it is believed that the manner of use and the structure of the test stand embodying the invention will be clear to those skilled in the art, it also being understood that any variations in the manner of use or structure thereof may be adhered to provided such variations fall within the spirit of the invention and the scope of the appended claims.

Having thus described the invention, what is claimed as new and desired to be secured by Letters Patent is:

1. The combination of a motor test stand for testing a motor case having a solid propellant therein comprising a base, an aft end for said motor case rigidly secured to said base, a head end for said motor case slidably mounted on said base, said aft end having an exhaust port therein, said head end having an opening therein to receive an igniter for the solid propellant in said motor case, a pair of diametrically-opposed slide rails mounted on said base, a table mounted for sliding movement in said rails, a U-shaped frame having vertically-disposed slots therein mounted on said table for supporting said head end on said table, said head end having slide projections on opposite edges thereof receivable in said slots, a latch bar rigidly connected to said U-shaped frame and engaging said head end to retain said head end in said U-shaped frame, and means for moving said head end and said motor case into pressure sealing contact with said aft end.

2. A test stand for a motor case having a solid propellant cast therein comprising a base member, means for supporting the motor case on said base, an aft end for the motor case having an exhaust port therein rigidly secured to said base in spaced, parallel relation to said last named means, a head end having an opening therein for receiving an electrical igniter therein slidably mounted on said base in alignment with said aft end, a nozzle insert mounted in said aft end, a graphite throat mounted in said insert in alignment with the exhaust port in said aft end, and means for moving said head end into engagement with said motor case and said motor case into engagement with said aft end.

3. A test stand for a motor case having a solid propellant cast therein comprising a base member, means for supporting the motor case on said base, an aft end for the motor case having an exhaust port therein rigidly secured to said base in spaced, parallel relation to said last named means, a head end having an opening therein for receiving an electrical igniter therein slidably mounted on said base in alignment with said aft end, a pair of slide rails mounted on said base, a table member mounted for sliding movement in said slide rails, a U-shaped frame mounted on said table and inter-engaging means provided on said head end and said frame for removably mounting said head end in said frame, and means for moving said head end into engagement with said motor case and said motor case into engagement with said aft end.

4. A test stand for a motor case having a solid propellant cast therein comprising a base member, means for supporting the motor case on said base, an aft end for the motor case having an exhaust port therein rigidly secured to said base in spaced, parallel relation to said last named means, a head end having an opening therein for receiving an electrical igniter therein slidably mounted on said base in alignment with said aft end, a pair of slide rails mounted on said base, a table member mounted for sliding movement in said slide rails, a U-shaped frame mounted on said table and inter-engaging means provided on said head end and said frame for removably mounting said head end in said frame, a latch bar pivotally mounted on said U-shaped frame to engage said head end to retain said head end in fixed relation to said U-shaped frame, and means for moving said head end into engagement with said motor case and said motor case into engagement with said aft end.

References Cited by the Examiner
UNITED STATES PATENTS 2,883,859  4/1959  Merrill _____ 73—49.6
3,191,426  6/1965  Wilhite et al. _____ 73—35

RICHARD C. QUEISSER, *Primary Examiner.*

J. W. MYRACLE, *Assistant Examiner.*